April 3, 1956 S. J. VELTON 2,740,222
TRAP HOOK FOR ARTIFICIAL BAIT
Filed Aug. 28, 1953 2 Sheets-Sheet 1
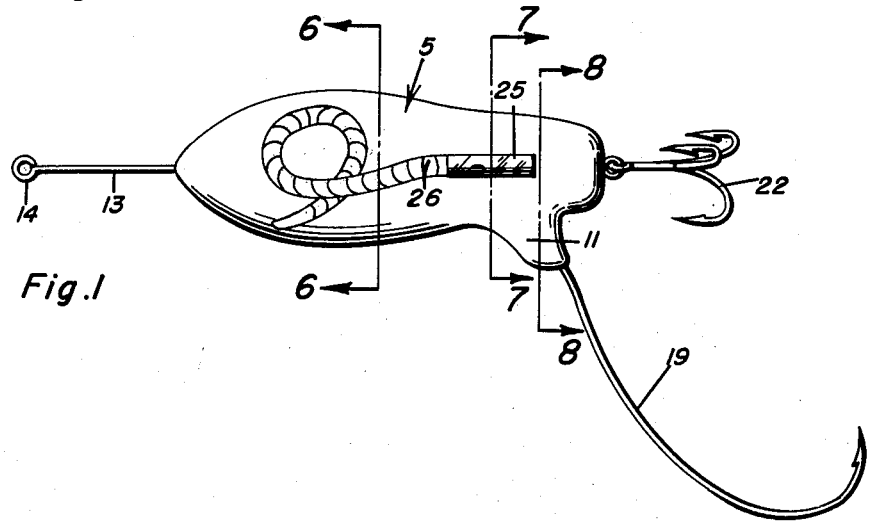
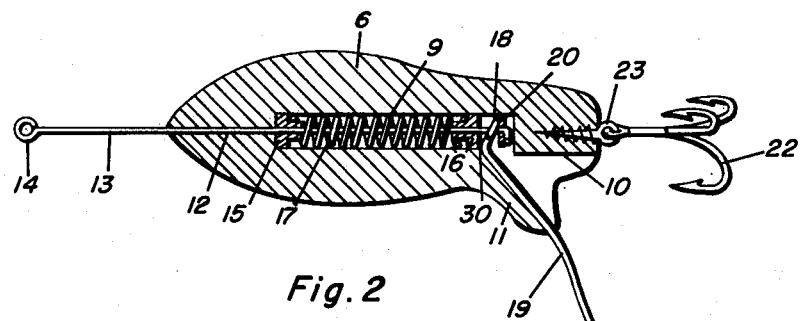
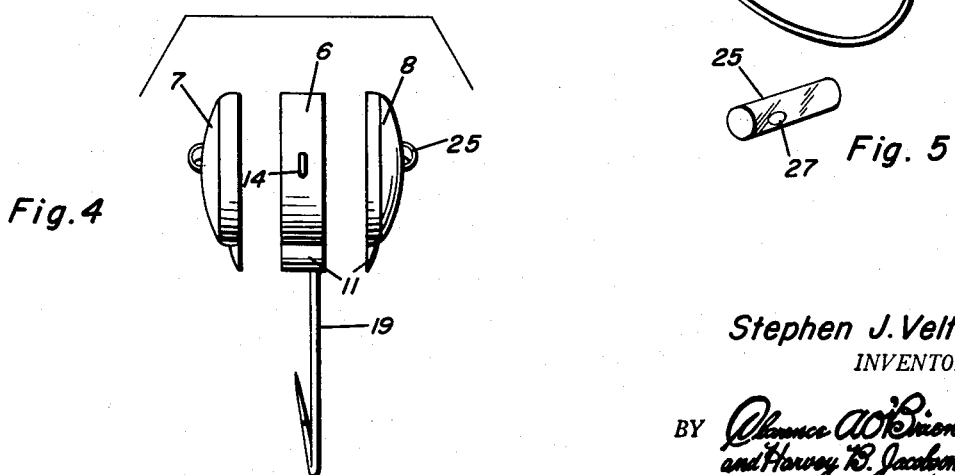
Stephen J. Velton
INVENTOR.

April 3, 1956    S. J. VELTON    2,740,222
TRAP HOOK FOR ARTIFICIAL BAIT
Filed Aug. 28, 1953    2 Sheets-Sheet 2
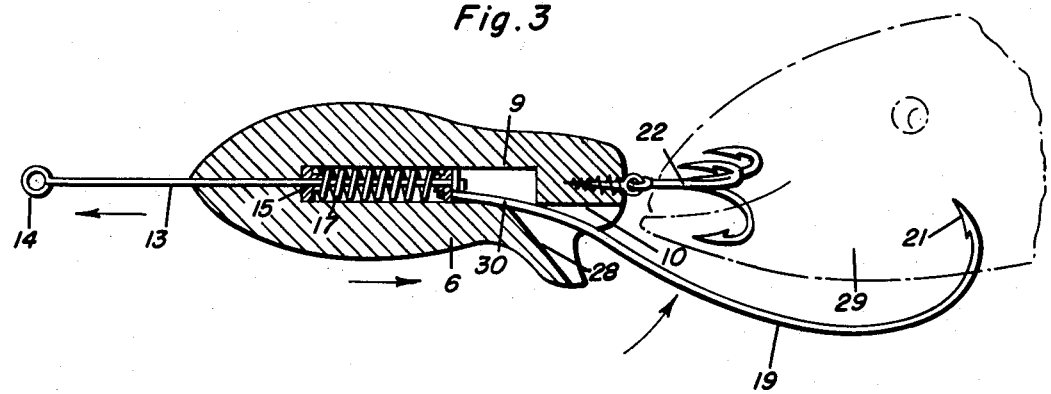
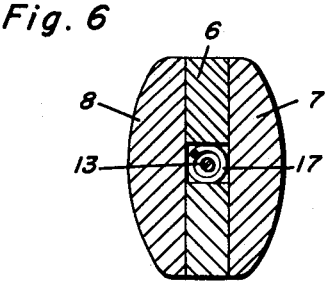
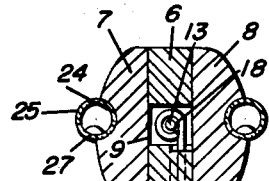
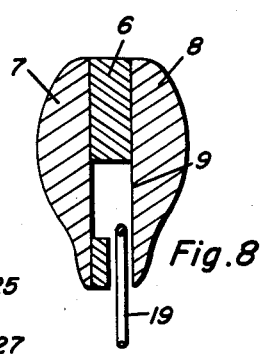
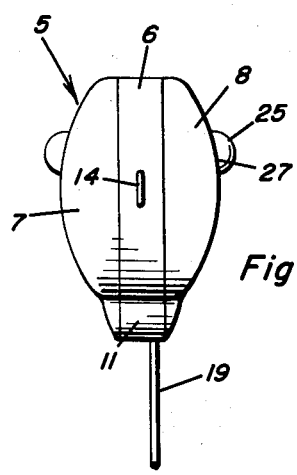
Stephen J. Velton
INVENTOR.
BY
Attorneys

United States Patent Office

2,740,222
Patented Apr. 3, 1956

2,740,222

TRAP HOOK FOR ARTIFICIAL BAIT

Stephen J. Velton, Houston, Tex., assignor of fifty per cent to Gertrude S. Velton, Houston, Tex.

Application August 28, 1953, Serial No. 377,042

2 Claims. (Cl. 43—35)

The present invention relates to new and useful improvements in artificial bait of the plug type and more particularly to the provision of a trap hook carried by the plug for engaging a fish striking the plug to effectively hold and prevent loss of the fish.

An important object of the invention is to swingably mount the trap hook to the body of the artificial bait and to actuate the hook in a fish engaging position through the medium of a fish striking the bait.

Another object is to provide an artificial bait composed of a body having imitation fishing worms attached thereto to function as a lure.

A further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view;

Figure 2 is a longitudinal sectional view showing the trap hook in position prior to the striking of a fish;

Figure 3 is a similar view showing the trap hook set in a fish when striking the bait;

Figure 4 is a group front elevational view of the side and center sections of the body of the bait;

Figure 5 is a perspective view of the fishing worm attaching tube;

Figures 6, 7 and 8 are enlarged transverse sectional views taken respectively on the lines 6—6, 7—7 and 8—8 of Figure 1; and Figure 9 is a front elevational view.

Referring now to the drawings in detail, wherein for the purpose of illustration I have disclosed a preferred embodiment of my invention, the numeral 5 designates a substantially ovate solid body composed of a longitudinal center section 6 and a pair of side sections 7 and 8, all having flat opposing sides cemented or otherwise suitably secured to each other in side-by-side relation.

Center section 6 is formed with a longitudinally extending slot or chamber 9 and a substantially V-shaped slot or notch 10 is formed in a rearwardly inclined fin 11 protruding from the rear lower portion of the center section and with the apex of the notch leading downwardly from the rear portion of slot or chamber 9 and with the notch open at the rear lower portion of the body.

A bore 12 is formed in the front end of body 5 leading forwardly from chamber 9 and a rod 13 is slidable in the bore with its front end projecting forwardly of the body and formed with an eye 14 for attaching a fishing line (not shown) thereto. The rear end of rod 13 extends longitudinally in chamber 9 through front and rear guides 15 and 16 also slidably mounted in the chamber. A coil spring 17 is mounted on the rod 13 between the front and rear guides and an eye 18 of a trap hook 19 is attached to the rear end of the rod behind the rear guide by a washer 20 behind which the rear end of the rod is bent. The hook 19 extends downwardly through slot or notch 10 and is formed with a barb at its free end which is positioned substantially below and rearwardly of body 5.

A multiple fishhook 22 is attached to the rear of body 5 by a screw eye 23.

The outer surfaces of side sections 7 and 8 are formed with longitudinal grooves 24 in which sealed transparent tubes 25 are cemented or otherwise suitably secured and imitation fishing worms 26 are painted or otherwise displayed at one end of each tube to function as a lure. A blob of mercury 27 is placed in each tube.

In the operation of the device, spring 17 holds the trap hook 19 in the rear portion of chamber 9 and with the shank of said hook resting against the rearwardly sloping portion 28 of notch or slot 10, as shown in Figure 2. The pulling force of a fish 29 striking the bait and caught on multiple hook 22 will slide the body 5 rearwardly with respect to rod 13 and the latter will thus pull the eye 18 of trap hook 19 forwardly which rocks or fulcrums on corner 30 at the junction of chamber 9 and slot or notch 10 and swings hook 19 upwardly to become set in the fish, as shown in Figure 3, and thus prevents the fish from freeing itself from hook 22.

The mercury 27 is free to move longitudinally in the tubes to attract fish by reason of its shining appearance.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An artificial bait comprising a body having a longitudinally elongated chamber therein, a fishhook attached to the body, fishing line attaching means slidably mounted in the chamber, resilient means in the chamber and opposing forward movement of said first named means, said body having an inclined slot in the bottom thereof leading from the rear end of the chamber and forming a shoulder of the junction of the slot with the chamber, and a trap hook attached to said first named means and extending therefrom downwardly through the slot in a rearwardly inclined position under the body, said trap hook having a portion thereof at its attachment with the first named means slidable into the chamber and fulcruming on the shoulder for swinging the trap hook upwardly toward the first named hook by a pulling force subjected to the line attaching means by a fish caught on the first named hook to set the trap hook in the fish.

2. An artificial bait comprising a body having a longitudinally elongated chamber therein and also having a substantially V-shaped slot leading downwardly to the bottom of the body and flared at a rearwardly inclined angle from the rear portion of the chamber and forming a shoulder at the junction of the slot with the chamber, a fishhook attached to the rear end of the body, fishing line attaching means slidably mounted in the chamber, spring means in the chamber and opposing forward movement of the first named means, and a trap hook attached to said first named means and having a portion thereof at its attachment adapted for sliding movement into said chamber and said trap hook extending downwardly through the slot for fulcruming movement on the shoulder for swinging the trap hook upwardly toward the first named hook by a pulling force subjected to the line attaching means by a fish caught on the first named hook to set the trap hook in the fish.

References Cited in the file of this patent

UNITED STATES PATENTS

| | | |
|---|---|---|
| 1,175,118 | Binlas | Mar. 14, 1916 |
| 1,372,831 | Roderick | Mar. 29, 1921 |
| 1,467,750 | Borg | Sept. 11, 1923 |
| 1,473,420 | Doering | Nov. 6, 1923 |
| 1,670,174 | Wiersma | May 15, 1928 |
| 2,087,955 | Middlemiss | July 27, 1937 |
| 2,474,481 | Kleppen et al. | June 28, 1948 |
| 2,502,562 | Fike | Apr. 4, 1950 |
| 2,576,532 | Nudell | Nov. 27, 1951 |
| 2,606,386 | Seabeck | Aug. 12, 1952 |